United States Patent
Peck

[15] 3,646,724
[45] Feb. 7, 1972

[54] CENTRIFUGAL FILTER
[72] Inventor: Thomas W. Peck, Horseheads, N.Y.
[73] Assignee: Powers Manufacturing, Inc., Elmira, N.Y.
[22] Filed: Jan. 9, 1970
[21] Appl. No.: 1,659

[52] U.S. Cl. ...........................55/274, 55/318, 55/458, 55/459, 55/524, 138/114
[51] Int. Cl. .................................................B01d 45/12
[58] Field of Search.................55/1, 274, 97, 394–399, 55/457, 454, 278, 458, 318, 459, 460, 524, 435; 138/114

[56] References Cited

UNITED STATES PATENTS

| | | | |
|---|---|---|---|
| 1,276,752 | 8/1918 | Goodall | 138/114 |
| 1,721,517 | 7/1929 | Kamrath | 55/278 |
| 2,232,913 | 2/1941 | Heuberger | 55/278 |
| 2,494,427 | 1/1950 | Bidwell et al. | 55/203 |
| 2,683,973 | 7/1954 | Mettler | 138/42 |
| 3,460,318 | 8/1969 | Creutz | 55/456 |
| 2,990,032 | 6/1961 | Sandvig | 55/274 |

Primary Examiner—Bernard Nozick
Attorney—Seidel, Gonda & Goldhammer

[57] ABSTRACT

A centrifugal filter is disclosed wherein solid matter entrained in a fluid can be separated by centrifugal force into contact with an adhesive surface such as a pressure-sensitive tape which partially defines a fluid flow path.

4 Claims, 8 Drawing Figures

PATENTED MAR 7 1972
3,646,724
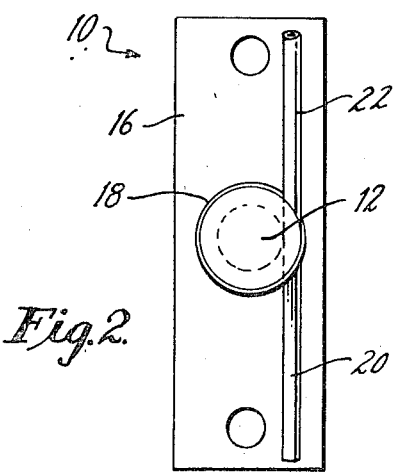
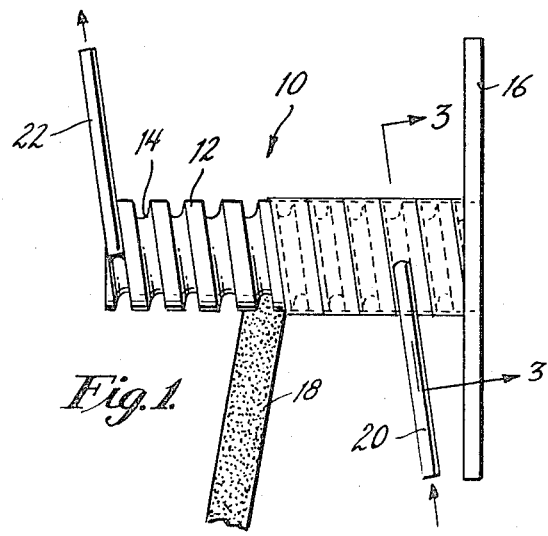
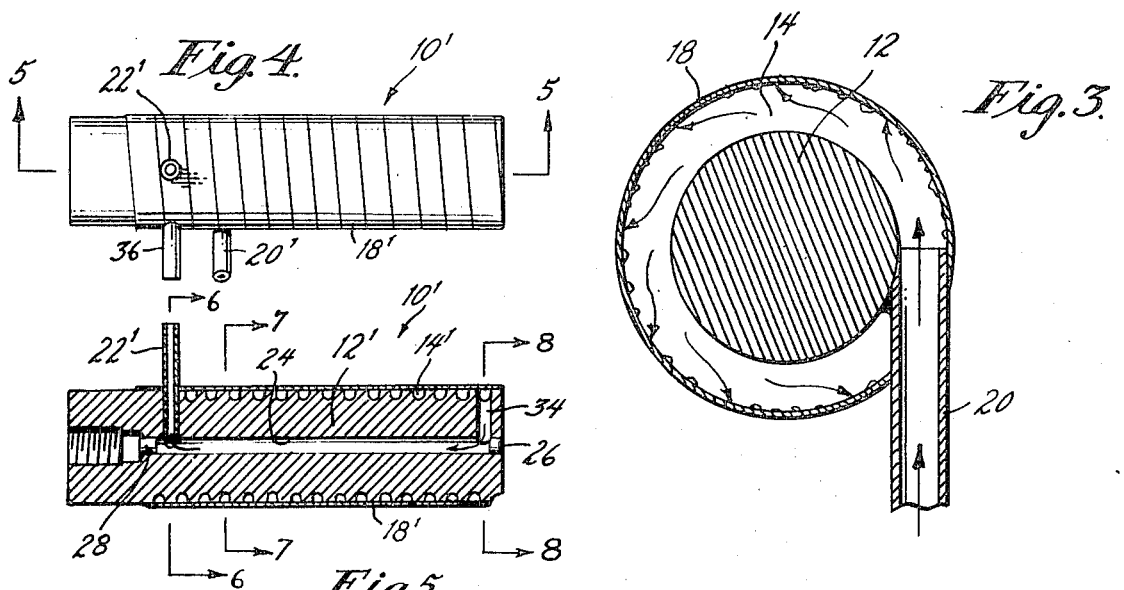
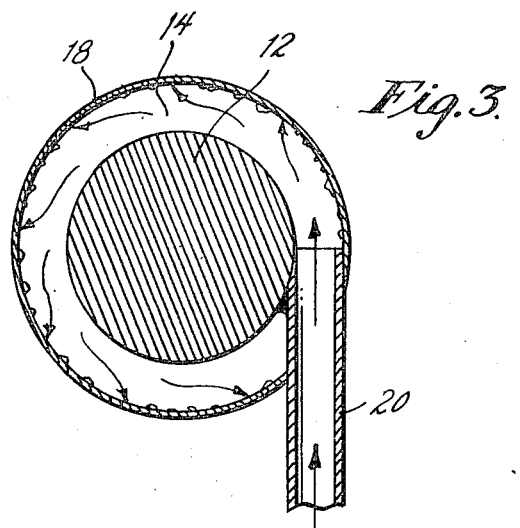
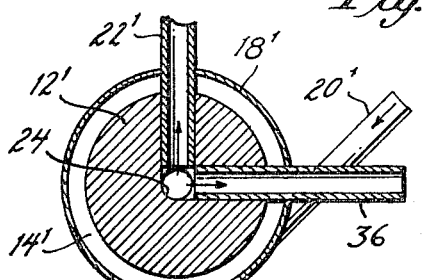
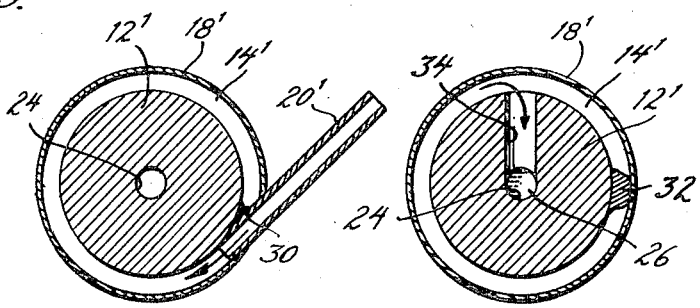
INVENTOR.
THOMAS W. PECK
BY
Seidel, Gonda, & Goldhammer
ATTORNEYS.

CENTRIFUGAL FILTER

The present invention is directed to a centrifugal filter, and more particularly, to a centrifugal filter which is simple, inexpensive to construct, reliable, and capable of having a wide variety of applications wherein a fluid free from solid particles is desired. The present invention is particularly adapted for use in instrumentation wherein the fluid such as room air contains impurities in the form of airborne particles which interfere with proper measurements or operation of the instruments.

There are some applications where the present invention is more suitable than conventional filters. In a commercially available bottle inspection device, a distinct frontal wave of carbon dioxide passing through a conduit is detected. It has been unexpectedly found that the present invention will perform with the following characteristics:

1. *Low turbulence*—so that sharp front of carbon dioxide is not destroyed.
2. *Low pressure drop* (negligible restriction)—to maintain desired flow rate in the flow system.
3. *Small volume cavity*—so that sharp front of carbon dioxide is not destroyed and so that excessive time is not lost in passing the front through the filter.
4. *Large filter surface*—The dirt collecting area of the tape is relatively large in comparison to the total volume within the filter.

No other commercially available gas filter investigated possessed these features.

In accordance with the present invention, the centrifugal filter includes a body having a helical or spiral path thereon partially defined at its outer periphery by an adhesive or tacky surface. In a preferred embodiment, the adhesive or tacky surface is defined by a pressure sensitive tape wound around the body. The adhesive surface can assume other forms such as a cylinder which is telescoped over the body. The flow path is defined by a helical or spiral path on the outer periphery of the body and the adhesive surface of a member which surrounds the body.

An inlet conduit means communicates with the flow path adjacent one end thereof. The inlet conduit means is preferably orientated with respect to the body so as to be tangentially arranged with respect thereto. An outlet conduit means communicates with the flow path at a location remote from the location wherein the inlet conduit means communicates with the flow path. As will be apparent hereinafter, the inlet conduit means and outlet conduit means may be adjacent to one another notwithstanding the fact that they communicate with the flow path at opposite ends thereof. The body which partially defines the flow path may be hollow or solid as will be apparent from the disclosure set forth hereinafter.

In a preferred embodiment of the present invention, the adhesive or tacky surface is on a member which is expendable. That is, after a period of use, the member having the adhesive or tacky surface may be removed and replaced with a new clean member. This feature of the present invention is more readily attainable by using adhesive pressure-sensitive tape as the member defining or having thereon the adhesive or tacky surface. The filter of the present invention is not limited to sizes, lengths or diameters. The cross-sectional configuration of the flow path should be calculated so as to be of sufficient size to handle the desired flow rate of the gas to be filtered while being sufficiently high so as to effect satisfactory centrifugal action on entrained particles.

It is an object of the present invention to provide a novel, simple, inexpensive and reliable centrifugal filter for removing solid particles from a fluid stream by centrifugal force.

It is another object of the present invention to provide a centrifugal filter wherein a helical flow path is partially defined by a member having an adhesive or tacky surface juxtaposed to the outer periphery of the flow path for removing solid particles from a fluid stream.

It is another object of the present invention to provide a novel means for removing solid particles from a fluid stream such as air by use of a helical flow path defined at its outer periphery by an adhesive or tacky surface which is removable and disposable.

Other objects will appear hereinafter.

For the purpose of illustrating the invention, there are shown in the drawings forms which are presently preferred; it being understood, however, that this invention is not limited to the precise arrangements and instrumentalities shown.

FIG. 1 is a side elevation view of a centrifugal filter of the present invention with the member defining the adhesive surface partially removed for purposes of illustration.

FIG. 2 is an end elevation view of the filter shown in FIG. 1.

FIG. 3 is a sectional view taken along the line 3—3 in FIG. 1.

FIG. 4 is a side elevation view of another embodiment of a centrifugal filter in accordance with the present invention.

FIG. 5 is a sectional view taken along the line 5—5 in FIG. 4.

FIG. 6 is a sectional view taken along the line 6—6 in FIG. 5.

FIG. 7 is a sectional view taken along the line 7—7 in FIG. 5.

FIG. 8 is a sectional view taken along the line 8—8 in FIG. 5.

Referring to the drawing in detail, wherein like numerals indicate like elements, there is shown a centrifugal filter designated generally as 10. The filter 10 is comprised of a body 12 having a helical groove 14 on its outer peripheral surface. If desired, body 12 may be conical so as to have a spiral groove on its outer peripheral surface. One end of body 12 is connected to and supported by a mounting bracket 16. The end of the groove 14 adjacent the bracket 16 is sealed in any convenient manner utilizing solder, wax, etc.

A member having an adhesive or tacky surface surrounds the body 12 and cooperates with the helical groove 14 to define a flow path. The member 18 is preferably pressure-sensitive tape. The pressure-sensitive surface on the tape 18 constitutes the means for joining member 18 to land portions on the outer peripheral surface of body 12 between adjacent convolutions of groove 14, with portions of the adhesive surface juxtaposed to the groove 14 and cooperating therewith to define the outer periphery of the flow path.

An inlet conduit means 20 communicates with the flow path at or adjacent one end thereof. As will be apparent from FIG. 2, inlet conduit means 20 is tangentially arranged with respect to the body 12. An outlet conduit means 22 communicates with the flow path at a location remote from the location wherein the inlet conduit means 20 communicates with the flow path. As will be apparent from FIG. 2, the outlet conduit means 22 is also tangentially arranged with respect to the body 12. The arrangement of the inlet conduit means 20 and outlet conduit means 22 need not be that as shown in FIG. 2 wherein the former extends downwardly and the latter extends upwardly. This arrangement is for purposes of illustration only. It is insignificant that the body 12 be solid or hollow.

The inlet conduit means 20 and the outlet conduit means 22 are preferably brazed, but may be soldered or welded, to the member 12 in any desired orientation consistent with the above disclosure. The depth of the groove 14 may be varied as desired. Using a groove 14 whose depth and width are each 0.075 inches, with 6 convolutions per inch, the filter of the present invention has been highly successful in removing entrained material of a wide variety of particle sizes and specific gravities from a gas stream flowing at the rate of 130 feet per second.

In FIG. 3, there has been illustrated on an enlarged scale particles collected on the adhesive surface of member 18. By using tape 18 in the form of transparent pressure-sensitive adhesive, the amount of particles removed may be readily ascertained since they will be visible through the tape 18. It may be noted that particles collected on the adhesive surface of member 18 collect progressively, starting at the inlet end of the filter, dirtying the adhesive toward the outlet end.

In FIGS. 4-8, there is illustrated another embodiment of the present invention designated generally as 10'. Filter 10' is identical with filter 10 except as will be made clear hereinafter. Accordingly, corresponding elements are provided with corresponding primed numerals.

In filter 10', the body 12' is hollow and has an axially directed bore 24. Bore 24 is closed at one end by a plug 26. The other end of bore 24 is closed by a plug 28. The sole function of these plugs is to close the ends of the bore which was formed by drilling entirely through the body.

The inlet conduit means 20' communicates with the flow path adjacent one end thereof. The left-hand end of the flow path is closed by inlet conduit means 20'. The other end of the flow path is closed by a drop of braze 32 filed smooth with the adjacent convolute lands. Tape 18' covering this region of the filter effects closure to the end of the helix path. See FIG. 8. The flow path communicates with the bore 24 adjacent the drop of braze 32 by means of passage 34 which extends radially inwardly from the outer periphery of body 12'. Hence, passage 34 interconnects one end of the helical flow path with one end of bore 24.

Outlet conduit means 22' communicates with the other end of the bore 24 adjacent plug 28. If desired, an additional outlet conduit means 36 may be provided when it is desired to deliver filtered air to more than one device. As will be apparent from FIG. 6, the outlet conduit means 22' and 36 each communicate with the bore 24 at the same location and are generally perpendicular to one another while being perpendicular to the bore 24. Other convenient orientations may be used, if desired.

In accordance with the means of filtration in accordance with the present invention, a particle laden gas stream is introduced tangentially into a helical path with the outer periphery of the helical path partially defined by an adhesive or tacky surface. Particles are centrifuged into contact with and remain attached to said surface.

The filter of this invention may assume other shapes. The body may be in the form of a U-shaped channel wound into the form of a helix with the open end of the channel on the outer periphery of the helix so that the tape may define the outer periphery of the flow path.

The helical path need not be a stationary path but rather could be attained by a suitable arrangement of body 12 having an axial groove on the periphery and mounted for rotation about its axis. The axial groove will simulate a helical path during rotation. Such an arrangement utilizes a small portion of the adhesive surface and is therefore not the preferred embodiment.

The fluid being filtered may be streams other than gases. If the fluid stream is a liquid stream, the tacky surface should be inert with respect to the liquid. If the liquid contains solid particles which are of lower density than the liquid, a tacky surface should be provided on the inner surface of the helical path.

The present invention may be embodied in other specific forms without departing from the spirit or essential attributes thereof and, accordingly, reference should be made to the appended claims, rather than to the foregoing specification as indicating the scope of the invention.

I claim:

1. A centrifugal filter comprising a cylindrical body, means on the body defining a peripheral helical groove closed at its ends, a member defining the outer periphery of the groove and having an adhesive surface juxtaposed to the outer periphery of said body, said member being a pressure-sensitive tape wound around said body with said surface secured to land portions on said body between adjacent convolutions of the helical groove, an inlet conduit means connected to said body, said inlet conduit means being tangentially arranged with respect to said body and communicating with said groove at a first location, an outlet conduit means communicating with said groove at a second location remote from said first location, whereby a gas stream entering said inlet conduit means is filtered by particles thereof attaching to said surface and clean gas exits from said outlet conduit means.

2. A filter in accordance with claim 1 wherein said tape is transparent so that the accumulation of particles on said surface may be ascertained by observation through said tape.

3. A filter in accordance with claim 1 wherein said body has a passage therein, one end of said passage communicating with said groove at said second location, the other end of said passage communicating with said outlet conduit means.

4. A filter in accordance with claim 1 wherein said outlet conduit means includes a plurality of conduits extending in different directions.

* * * * *